United States Patent Office 3,654,205
Patented Apr. 4, 1972

3,654,205
5-HYDROXY-2-SUBSTITUTED-FURO[2,3-d]PYRIM-
IDINE-6-CARBOXYLIC ACID, ESTERS
Dong H. Kim, Wayne, and Arthur A. Santilli, Havertown,
Pa., assignors to American Home Products Corporation,
New York, N.Y.
No Drawing. Filed Nov. 4, 1969, Ser. No. 874,054
Int. Cl. C07d 51/46
U.S. Cl. 260—251 A          3 Claims

ABSTRACT OF THE DISCLOSURE

5 - hydroxy - 2 - substituted-furo[2,3-d]pyridimidine-6-carboxylic acid, esters (I) useful as CNS depressants in the calming of animals are disclosed as well as methods of synthesizing the compounds (I) by contacting a pyrimidine (III) with an alkali metal hydride. The CNS depressant compound 5-hydroxy-2-phenylfuro[2,3-d]pyrimidine-6-carboxylic acid, methyl ester is produced by refluxing 4 - carboxymethoxy-2-phenyl-5-pyridinecarboxylic acid, 5-ethyl ester, 4-methyl ester with sodium hydride in tetrahydrofuran.

---

This invention concerns new and novel 5-hydroxy-2-substituted-furo[2,3 - d]pyrimidine - 6 - carboxylic acid, esters. Additionally, this invention relates to intermediates and methods useful in the synthesis of the new and novel compounds of the present invention.

The compounds of the present invention have the formula:

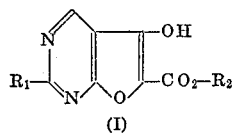

(I)

wherein $R_1$ is selected from the group consisting of lower alkyl, lower alkylthio, phenyl, p-halophenyl, lower alkylphenyl, lower alkoxyphenyl, phen(lower)alkyl, halophenyl (lower)alkyl and lower alkoxy(lower)alkyl; and $R_2$ is selected from the group consisting of lower alkyl.

The terms "lower alkyl," "lower alkoxy" and the like as employed herein refer to both branched and straight chain groups containing from one up to about six carbon atoms. The term "halo" as used herein refers to halogens; chloride, iodine, bromine and fluorine.

Synthesis

The compounds of Formula I may be prepared by reacting a salt, such as analkali metal salt (e.g. sodium, potassium, etc.), of a 4-hydroxy-2-substituted-5-pyrimidine-carboxylic acid, ester of the formula;

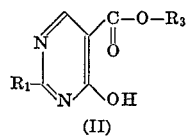

(II)

wherein $R_1$ is as set forth in Formula I and $R_3$ is lower alkyl, with a lower alkyl haloacetate by contacting in an appropriate reaction inert organic solvent, such as a di(lower)alkylformamide (i.e. dimethylformamide), by heating at about the reflux temperature for a period ranging from about five minutes up to about three hours. The resulting compounds are recovered by routine procedures, such as pouring into chilled water to form a precipitate which is collected by filtration and then recrystallized from a suitable solvent, such as an alkanol (e.g. methanol). The resulting intermediate compound has the formula:

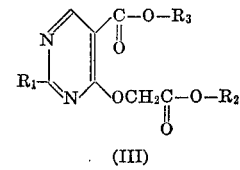

(III)

wherein $R_1$ and $R_2$ are as set forth in Formula I and $R_3$ is as set forth in Formula II. The expression "reaction inert organic solvent" as used herein refers to an organic solvent or solvent system in which the reaction may take place without being affected thereby. The starting materials of the Formula II are well known in the art and the salts may readily be prepared by standard procedures.

The intermediate compounds of the Formula III are then reacted by contacting with an alkali metal hydride (i.e. sodium hydride) in an appropriate reaction inert organic solvent (e.g. tetrahydrofuran) at about the reflux temperature of the reaction mixture for a period ranging from about ten minutes up to about four hours. The compounds fomed, Formula I, are recovered by routine procedures, such as evaporating the solvent and pouring the residue into chilled water, extracting the aqueous solution with an immiscible organic solvent such as ether, acidifying the water solution, and collecting the resulting precipitate by filtration and the recrystallizing it from a suitable solvent, such as an alkanol (e.g. methanol).

The compounds of the present invention (I) are central nervous system depressants and are, therefore, useful for producing a calming effect in animals. These compounds (I) are effective when administered orally at a dosage range of from about 127.00 mg./kg. up to about 400.00 mg./kg. of the animal being treated. Central nervous system depressant activity was measured in the test for general central nervous system activity as follows: The compounds are administered orally to three mice (CF–1; 14 to 24 grams) as a suspension emulsified in an aqueous vehicle with 1% polyethylene oxide sorbitan mono-oleate at each of the following doses: 400, 127, 40 and 12.7 mg./kg. The animals are watched for a minimum of two hours during which time signs of general stimulation (i.e. increased spontaneous motor activity, hyperactivity on tactile stimulation, twitching), general depression (i.e. decreased spontaneous motor activity, decreased respiration) and autonomic activity (i.e. miosis, mydriasis, diarrhea) are noted. The animals are tested for changes in reflexes (i.e. flexor, extensor) and are rated by use of a pole climb and inclined screen for the presence of sedation-atoxia. A test similar to the "Eddy Hot-Plate Method" [Nathan B. Eddy and Dorothy Leimbach, J. Pharmacol. Exper. 107, 385 (1953)] is used to test for analgesia. The experiment is terminated by subjecting each animal to a maximal electroshock to test for anticonvulsant activity.

When the compounds of the present invention are employed as a CNS depressant they may be prepared in conventional dosage forms. Oral dosage forms would include tablets, oral solutions, oral suspensions, pills, capsules, granules, powders, elixirs, dragées and in admixtures with foodstuffs or drinking water. For ease of administration, the compositions may be provided in unit dosage forms, in which the medication is provided in a one dose form. This would include the solid or shaped solid dosage forms or premeasured packaged portions of the other dosage forms.

The tablets may contain conventional tablet adjuvants such as binders, carriers, lubricating agents or other substances added to provide ease in tableting or disintegration of the tablets. These adjuvants may include cornstarch, lactose, dicalcium phosphate, talc, stearic acid, magnesium stearate and gums. The tablets may be in the form of sustained or delayed release compositions by known methods involving the use of coatings to provide varying release rates.

The intermediate compounds of the present invention (Formula III) also may demonstrate efficacy, in vitro, as antiamebic agents, when tested by a procedure based on that described by Thompson et al., Antibio. & Chemo., 6 (1956) 337–50. The test is standardized against emetine and run on cultures of *E. histolytica*. Antiamebic agents are effective wherever placed in contact with the ameba. This would include dosage forms such as ointments, creams, lotions, topical aerosols and suppositories (vaginal and rectal). The intermediate compound, 4-carboxymethyl - 2 - phenyl-5-pyrimidine - carboxylic acid, 5-ethyl ester, 4-methyl ester, was active when tested by the described procedure.

The following examples are illustrative of the present invention:

EXAMPLE I

To a solution containing 7 g. of methyl chloroacetate in 100 ml. of dimethylformamide, there is added 13 g. of the sodium salt of 4-hydroxy-2-phenyl-5-pyrimidinecarboxylic acid, ethyl ester, and the resulting mixture is stirred at room temperature for one and one-half hours, then refluxed gently for one-half hour. After chilling to room temperature, the reaction mixture is poured into about 300 ml. of ice-water whereby precipitation of solid material occurs. The precipitate is collected on a filter and washed with water several times to give 13 g. of 4-carboxymethoxy-2-phenyl-5-pyrimidinecarboxylic acid, 5-ethyl ester, 4-methyl ester, M.P. 67–72° C. Recrystallization from absolute methanol increases M.P. to 72–74° C.

*Analysis.*—Calcd. for $C_{16}H_{16}N_2O_5$ (percent): C, 60.75; H, 5.10; N, 8.86. Found (percent): C, 60.71; H, 5.02; N, 8.85.

In a similar manner, using the appropriate starting materials, the following compounds are provided:

4-carboxymethoxy-2-methyl-5-pyrimidinecarboxylic acid, 4-butyl ester, 5-methyl ester;
4-carboxymethoxy-2-(2-methoxyethyl)-5-pyrimidinecarboxylic acid, 4-isopropyl ester, 5-propyl ester;
4-carboxymethoxy-2-(2-phenethyl)-5-pyrimidinecarboxylic acid, 4-ethyl ester, 5-butyl ester;
4-carboxymethoxy-2-(p-fluorophenyl)-5-pyrimidinecarboxylic acid, 4-propyl ester, 5-ethyl ester;
4-carboxymethoxy-2-methylthio-5-pyrimidinecarboxylic acid, 4-hexyl ester, 5-propyl ester;
4-carboxymethoxy-2-isopropyl-5-pyrimidinecarboxylic acid, 4-butyl ester, 5-ethyl ester;
2-(p-bromobenzyl)-4-carboxymethoxy-5-pyrimidinecarboxylic acid, 4-methyl ester, 5-propyl ester;
4-carboxymethoxy-2-(p-tolyl)-5-pyrimidinecarboxylic acid, 4-ethyl ester, 5-methyl ester;
4-carboxymethoxy-2-(p-chlorophenyl)-5-pyrimidinecarboxylic acid, 4,5-diethyl ester;
4-carboxymethoxy-2-ethyl-5-pyrimidinecarboxylic acid, 4-butyl ester, 5-methyl ester;
4-carboxymethoxy-2-(2-methoxyethyl)-5-pyrimidinecarboxylic acid, 4-ethyl ester, 5-propyl ester;
2-(p-bromophenyl)-4-carboxymethoxy-5-pyrimidinecarboxylic acid, 4,5-dimethyl ester;
4-carboxymethoxy-2-(p-methoxyphenyl)-5-pyrimidinecarboxylic acid, 4-ethyl ester, 5-methyl ester;
4-carboxymethoxy-2-ethylthio-5-pyrimidinecarboxylic acid, 4-methyl ester, 5-butyl ester;
4-carboxymethoxy-2-ethoxymethyl-5-pyrimidinecarboxylic acid, 4-ethyl ester, 5-butyl ester;
4-carboxymethoxy-2-[2-(p-fluorophenyl)ethyl]-5-pyrimidinecarboxylic acid, 4-ethyl ester, 5-methyl ester;
4-carboxymethoxy-2-(p-iodophenyl)-5-pyrimidinecarboxylic acid, 4-methyl ester, 5-propyl ester;
4-carboxymethoxy-2-(3-phenpropyl)-5-pyrimidinecarboxylic acid, 4-methyl ester, 5-ethyl ester;
4-carboxymethoxy-2-(p-propoxyphenyl)-5-pyrimidinecarboxylic acid, 4-ethyl ester, 5-methyl ester;
4-carboxymethoxy-2-[2-(o-iodophenyl)ethyl]-5-pyrimidinecarboxylic acid, 4-ethyl ester, 5-butyl ester;
2-butyl-4-carboxymethoxy-5-pyrimidinecarboxylic acid, 4-methyl ester, 5-ethyl ester;
4-carboxymethoxy-2-[2-(p-chlorophenyl)ethyl]-5-pyrimidinecarboxylic acid, 4-ethyl ester, 5-propyl ester;
4-carboxymethoxy-2-(p-ethylphenyl)-5-pyrimidinecarboxylic acid, 4-methyl ester, 5-ethyl ester;
2-benzyl-4-carboxymethoxy-5-pyrimidinecarboxylic acid, 4-methyl ester, 5-ethyl ester.

EXAMPLE II

To a stirred suspension of sodium hydride (50% oil dispersion, 0.55 g.) in tetrahydrofuran (70 ml.) there is added 3.1 g. of 4-carboxyethoxy-2-phenyl-5-pyrimidinecarboxylic acid, 5-ethyl ester, 4-methyl ester. The resulting mixture is stirred at room temperature for fifteen minutes, then refluxed for one hour. Most of the tetrahydrofuran is removed under reduced pressure, and the residue is poured into a large excess of ice water, and the aqueous solution is washed with ether. Any insoluble material is removed from the aqueous solution by filtration, and the filtrate is acidified with 3 N hydrochloric acid to about pH 3, whereby a precipitate is separated. The precipitate is collected on a filter, and washed with water several times to give 1.2 g. of product, 5-hydroxy-2-phenylfuro[2,3-d]pyrimidine-6-carboxylic acid, methyl ester, M.P. 173–175° C. Recrystallization from methanol increases the M.P. to 176–178° C.

*Analysis.*—Calcd. for $C_{14}H_{10}N_2O_4$ (percent): C, 62.22; H, 3.73; N, 10.37. Found (percent): C, 62.45; H, 4.10; N, 10.25.

In a similar manner, using appropriate starting materials, the following compounds are provided:

5-hydroxy-2-methylfuro[2,3-d]pyrimidine-6-carboxylic acid, butyl ester;
5-hydroxy-2-(methoxymethyl)furo[2,3-d]pyrimidine-6-carboxylic acid, isopropyl ester;
5-hydroxy-2-(2-phenethyl)furo[2,3-d]pyrimidine-6-carboxylic acid, ethyl ester;
2-(p-fluorophenyl)-5-hydroxyfuro[2,3-d]pyrimidine-6-carboxylic acid, propyl ester;
5-hydroxy-2-(methylthio)furo[2,3-d]pyrimidine-6-carboxylic acid, hexyl ester;
5-hydroxy-2-isopropylfuro[2,3-d]pyrimidine-6-carboxylic acid, butyl ester;
2-(p-bromobenzyl)-5-hydroxyfuro[2,3-d]pyrimidine-6-carboxylic acid, methyl ester;
5-hydroxy-2-(p-tolyl)furo[2,3-d]pyrimidine-6-carboxylic acid, ethyl ester;
2-(p-chlorophenyl)-5-hydroxyfuro[2,3-d]pyrimidine-6-carboxylic acid, etyhl ester;
2-ethyl-5-hydroxyfuro[2,3-d]pyrimidine-6-carboxylic acid, butyl ester;
5-hydroxy-2-(2-methoxyethyl)furo[2,3-d]pyrimidine-6-carboxylic acid, ethyl ester;
2-(p-bromophenyl)-5-hydroxyfuro[2,3-d]pyrimidine-6-carboxylic acid, 4-methyl ester;
5-hydroxy-2-(p-methoxyphenyl)furo[2,3-d]pyrimidine-6-carboxylic acid, 4-ethyl ester;
2-ethylthio-5-hydroxyfuro[2,3-d]pyrimidine-6-carboxylic acid, methyl ester;
2-ethoxymethyl-5-hydroxyfuro[2,3-d]pyrimidine-6-carboxylic acid, ethyl ester;
2-[2-(p-fluorophenyl)ethyl]-5-hydroxyfuro[2,3-d]-pyrimidine-6-carboxylic acid, ethyl ester;
5-hydroxy-2-(p-iodophenyl)furo[2,3-d]pyrimidine-6-carboxylic acid, methyl ester;
5-hydroxy-2-(3-phenpropyl)furo[2,3-d]-pyrimidine-6-carboxylic acid, methyl ester;

5-hydroxy-2-(p-propoxyphenyl)furo[2,3-d]-
pyrimidine-6-carboxylic acid, ethyl ester;
5-hydroxy-2-[2-(o-iodophenyl)ethyl]furo[2,3-d]-
pyrimidine-6-carboxylic acid, ethyl ester;
2-butyl-5-hydroxyfuro[2,3-d]pyrimidine-6-
carboxylic acid, methyl ester;
2-[2-(p-chlorophenyl)ethyl]-5-hydroxyfuro[2,3-d]-
pyrimidine-6-carboxylic acid, ethyl ester;
2-(p-ethylphenyl)-5-hydroxyfuro[2,3-d]pyrimidine-
6-carboxylic acid, methyl ester;
2-benzyl-5-hydroxyfuro[2,3-d]pyrimidine-
6-carboxylic acid, methyl ester;
2-butyl-5-hydroxyfuro[2,3-d]pyrimidine-6-
carboxylic acid, methyl ester;
2-[2-(p-chlorophenyl)ethyl]-5-hydroxyfuro[2,3-d]-
pyrimidine-6-carboxylic acid, ethyl ester;
2-(p-ethylphenyl)-5-hydroxyfuro[2,3-d]pyrimidine-
6-carboxylic acid, methyl ester;
2-benzyl-5-hydroxyfuro[2,3-d]pyrimidine-
6-carboxylic acid, methyl ester.

What is claimed is:
1. A compound selected from the group having the formula:

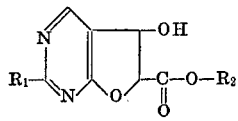

wherein $R_1$ is selected from the group consisting of phenyl, lower alkylphenyl, and phen (lower)alkyl; and $R_2$ is selected from the group consisting of lower alkyl.

2. A compound as described in claim 1 which is: 5-hydroxy-2-phenylfuro[2,3-d]pyrimidine-6-carboxylic acid, methyl ester.

3. A method of preparing a compound having the formula:

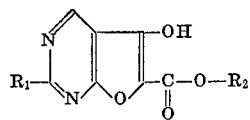

wherein $R_1$ is selected from the group consisting of phenyl, lower alkylphenyl and phen (lower)alkyl; and $R_2$ is selected from the group consisting of lower alkyl, which comprises contacting a compound having the formula:

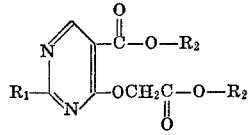

wherein $R_1$ and $R_2$ are as set forth above and $R_3$ is lower alkyl by heating at about reflux temperature for a period of time ranging from about ten minutes up to about four hours with an alkali metal hydride in a reaction inert organic solvent.

References Cited

Shvedov et al.: C.A. 68, 59519h (1968).

ALEX MAZEL, Primary Examiner
R. V. RUSH, Assistant Examiner

U.S. Cl. X.R.
260—251 R; 424—251